(No Model.)
J. M. FOOTE.
HAY ELEVATOR.
No. 317,109. Patented May 5, 1885.
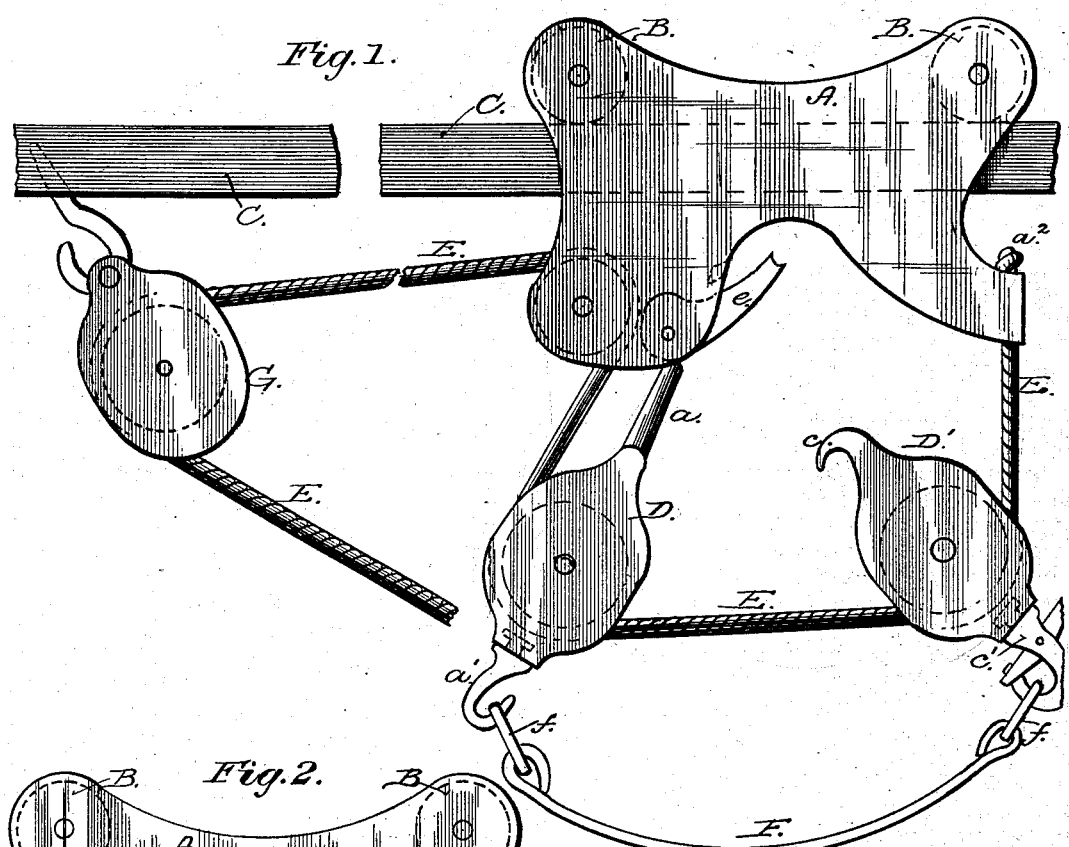
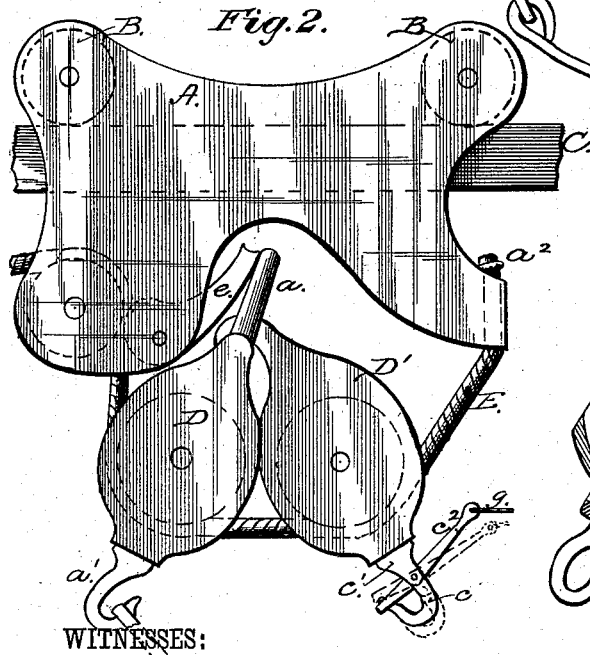
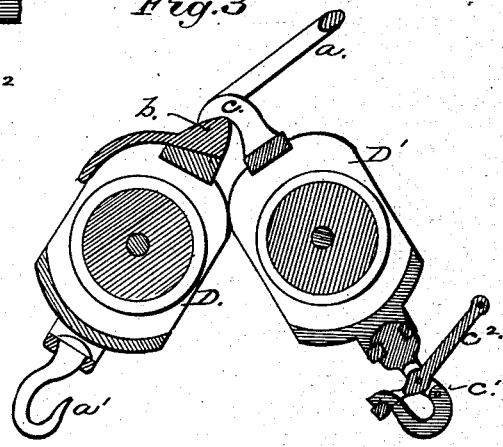
WITNESSES:
INVENTOR.
James M. Foote
By Parker H. Sweet Jr.
ATTORNEYS.

UNITED STATES PATENT OFFICE.

JAMES M. FOOTE, OF CLAYTON, MICHIGAN.

HAY-ELEVATOR.

SPECIFICATION forming part of Letters Patent No. 317,109, dated May 5, 1885.

Application filed December 19, 1884. (No model.)

*To all whom it may concern:*

Be it known that I, JAMES M. FOOTE, a citizen of the United States, residing at Clayton, in the county of Lenawee and State of Michigan, have invented certain new and useful Improvements in Hay-Elevators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an improved and novel device for elevating and unloading hay, grain, or other similar articles in the quickest and best possible manner; and it consists, essentially, in the details of construction and general arrangement of parts, all as will be hereinafter fully described, and specifically designated in the claims.

In the accompanying drawings, Figure 1 represents a front elevation of my invention in position to elevate a load of hay or grain; Fig. 2, a similar view of the same in a position ready to discharge its load, and Fig. 3 a detail view thereof.

Similar letters of reference occurring on the several figures indicate corresponding parts.

Referring to the drawings, A represents the frame of the carrier, which is provided with wheels B, adapted to roll upon the supporting-track C, in a manner well known. The carrier A is also provided with a suitable catch-latch, $e$, which is adapted to engage with suitable stops upon the supporting-track C to stop said carrier at any desired point or points.

D represents a pulley-block provided at its upper end with the bail $a$ and cross-bar $b$, and at its lower end with the swivel-hook $a'$, as fully shown in Fig. 3.

D' represents a pulley-block provided at its upper end with an enlarged flat hook, $c$, and at its lower end with a swiveled trip-hook, $c'$, which is adapted to be operated by the cord $g$, as will be hereinafter more fully described.

The draft-rope E is securely fastened at its upper end to the carrier A, as shown at $a^2$, and passed from thence under the pulley in the block D, thence under the pulley in the block D', up to and over the pulley G, attached to the supporting-track C, from whence it passes to the motive power for operating the device.

The construction of my invention being as above described, it will be observed that in the operation of the same the hay or grain is first loaded in the field upon the sling or band F, which is provided with a ring, $f$, at each end, as shown. In elevating the load of hay or grain the swivel-hook $a'$ of the pulley-block D is adjusted into one of the rings $f$, and the trip-hook $c'$ of the pulley-block D' into the opposite ring of the said sling F, and the power being applied to the draft-rope E, the two pulley-blocks D D' are drawn together in such manner that the hook $c$ of the pulley-block D' catches over upon the cross-bar $b$ of the pulley-block D to lock the two together, as fully shown in Fig. 3, while at the same time the load of hay or grain is pressed into a compact mass within the sling F, and is then drawn up to the carrier A, the bail $a$ of the pulley-block D engaging with the catch-latch $e$ to release the carrier A from the stop upon the supporting-track C, and allowing the load of hay or grain to be carried to the desired point for unloading, which is accomplished by pulling the cord $g$, which lifts the lever $c^2$ of the trip-hook $c'$, causing the said trip-hook to become disengaged from the ring $f$ of the sling F, as indicated in dotted lines in Fig. 2. The carrier A may then be drawn back to its original position ready for a similar operation. The operation of drawing the carrier A back to its original position releases the catch-latch and allows the pulley-blocks D D' to become unhooked from each other and drop down in proper position for attachment to another load of hay or grain.

By means of my improvements the entire load of hay or grain is drawn compactly together and carried to the desired point without waste or litter, or the entanglement of the ropes and pulleys, as is usually the case with the ordinary devices now in use.

Having thus described my invention, what I claim as new and useful is—

1. In a hay or grain elevator, the pulley-block D, provided with the bail $a$, cross-bar $b$, and swivel-hook $a'$, and the pulley-block D', provided with the rigid hook $c$, swivel trip-hook $c'$, and cord $g$, in combination with the rings $f$, of the sling F, carrier A, catch-latch $e$, pulley-block G, supporting-track C, and draft-rope E, all substantially as and for the purpose specified.

2. In a hay or grain elevator, the pulley-block D, provided with the bail $a$, cross-bar $b$, and swivel-hook $a'$, in combination with the pulley D', provided with the rigid hook $c$ and swivel trip-hook $c'$, substantially as and for the purpose specified.

In testimony whereof I affix my signature in presence of two witnesses.

JAMES M. FOOTE.

Witnesses:
  I. N. WARREN,
  JOHN MOORE.